Patented Oct. 28, 1941

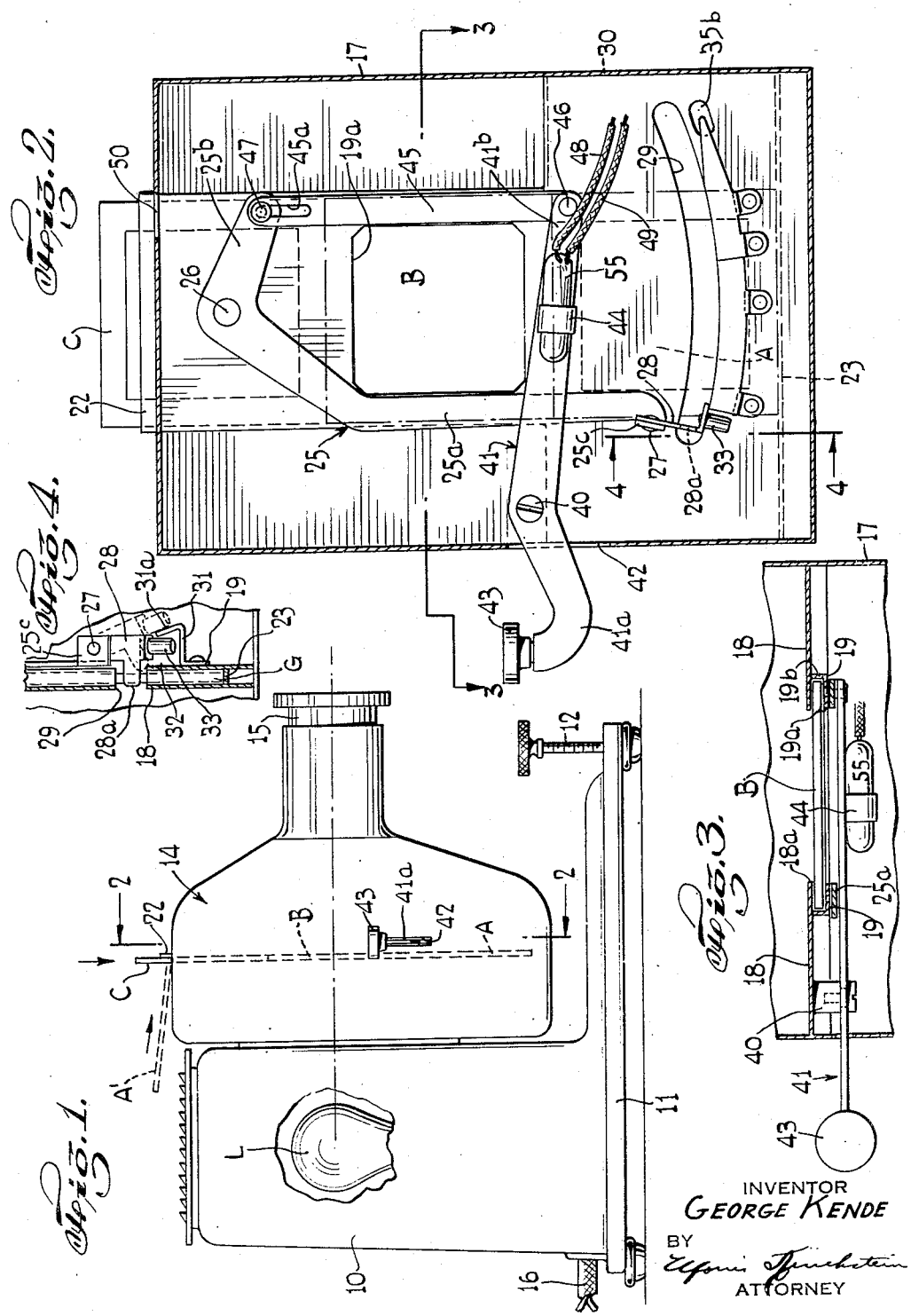

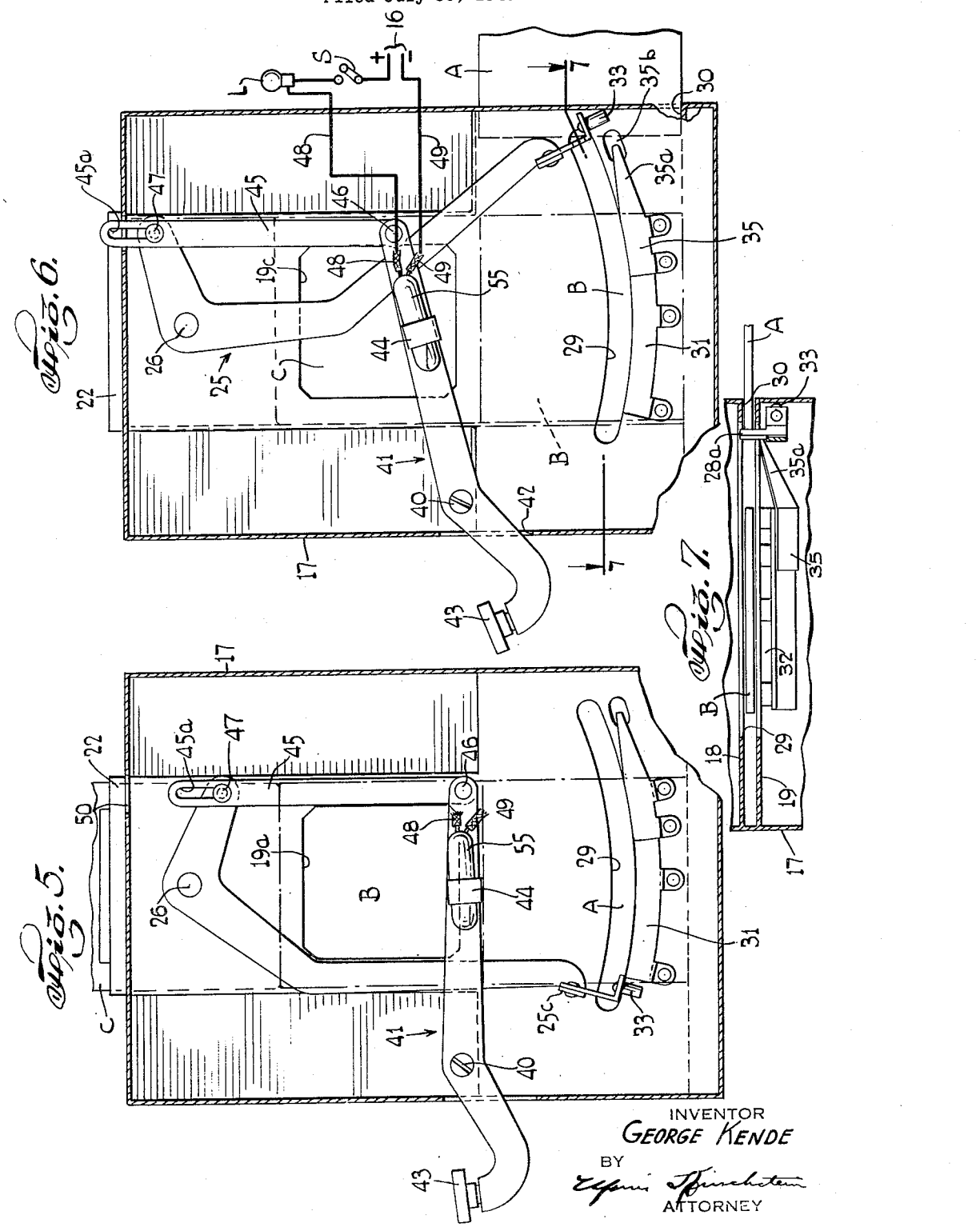

2,260,673

UNITED STATES PATENT OFFICE 2,260,673

SLIDE PROJECTION APPARATUS

George Kende, New York, N. Y., assignor to Universal Camera Corporation, New York, N. Y., a corporation of Delaware Application July 30, 1940, Serial No. 348,338

3 Claims. (Cl. 88—28)

This invention relates to slide projection apparatus.

One of the objects of this invention is to provide a slide projection apparatus having novel and improved mechanism for readily feeding and ejecting the slides, and so constructed that in the operation thereof, the light of the projector lamp will be automatically extinguished during the time when the slides are being moved.

Another object of this invention is to provide a slide projection apparatus of the character described which shall be simple in construction and practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a side elevational view of a slide projection apparatus constructed in accordance with my invention;

Fig. 2 is an enlarged cross-sectional view taken substantially on the line 2—2 of Fig. 1;

Fig. 3 is a cross-sectional view taken substantially on the line 3—3 of Fig. 2;

Fig. 4 is a cross-sectional view taken substantially on the line 4—4 of Fig. 2;

Figs. 5 and 6 are views similar to Fig. 2 but illustrating two steps in the operation of the apparatus; and Fig. 7 is a cross-sectional view taken substantially on the line 7—7 of Fig. 6.

Referring now in detail to the drawings, the slide projection apparatus embodying my invention there shown comprises generally, as illustrated in Fig. 1, a lamp housing 10 supported on a base 11, which in turn may be provided with an adjusting screw member 12 at the forward end thereof for tilting the apparatus in the customary manner. The lamp housing 10 is designed to house an incandescent lamp L of the type customarily employed in slide projection apparatus. Supported by the lamp housing 10 is a slide handling unit 14 in which a suitable projection lens 15 is disposed in optical alignment with the lamp L within the lamp housing 10. The current for energizing the lamp is fed from any suitable source through lead wires 16 and a manually actuated control switch S.

The slide handling unit 14 comprises an outer casing 17 and a pair of interiorly disposed parallel walls 18 and 19. The sides of the upper part of the wall 19 are formed into angular portions 19b to provide a channel or guideway G for feeding and positioning suitable slides to be projected. As shown in Figs. 2 and 3, the walls 18 and 19 are provided with apertures 18a and 19a respectively, in optical alignment with each other and with the optical axis of the projector, so as to permit projection of a slide B suitably positioned and aligned between said apertures, in the manner hereinafter described. The top wall of the casing 17 is provided with a slotted opening corresponding in size and communicating with the slide guideway G. The casing 17 is also provided with an upstanding flange 22 adjacent one edge of the said slotted opening in the casing, to facilitate the insertion of the slides in the guideway G. At the bottom of the slide guideway G there is provided at platform 23 for limiting the downward travel of the slides in the guideway G. The guideway G may be designed to hold any desired number of slides, such as for example the three slides A, B and C shown in the drawings. The slides A, B and C are held within the guideway in contiguous position, so that the middle slide B will be in optical alignment with the incandescent lamp L and with the projection lens 15. In other words, in loading the projector with slides, an edge of the first slide A is angularly moved into abutment with the flange 22, as shown by the dotted line representation A' in Fig. 1, to properly locate the same, after which it is passed through the slot in the casing 17 and then down the guideway G until it rests upon the platform 23. The next slide B is then placed in the guideway, where it rests upon the top edge of the slide A. The slide C is then inserted in the guideway where it rests upon slide B.

In accordance with this invention, the following mechanism has been provided for ejecting one slide, which action automatically places the next successive slide in proper optical position for projection. A lever 25 is pivotally mounted on a pivot 26 suitably fixed to the wall 19. The lever 25 comprises a downwardly depending arm 25a on one side of the pivot 26 and a relatively shorter arm 25b, angularly disposed with respect to the arm 25a and on the opposite side of the said pivot 26. The lower end of the arm 25a is provided with a portion 25c angularly bent with respect to the plane of the arm 25a.

Pivotally attached to the said arm portion 25c by any suitable attaching means, such as for example the pivot 27, is a slide moving member 28, provided with finger portion 28a projecting inwardly through a pair of aligned arcuate slots 29 in the guideway walls 18 and 19 (see Figs. 2 and 4). As shown in Fig. 2, the slots 29 and the finger 28a of the member 28 are so disposed with respect to the lowermost slide A that normally the said finger 28a will lie adjacent to the left hand vertical edge of the said slide C (as viewed from Fig. 2) and substantially midway between the top and bottom of the said slide A.

It is thus seen from the above described construction that when the lever 25 is rotated about the pivot 26 in a counter-clockwise direction, the finger 28a will move in an arcuate path within the slot 29 to slidably move the slide A laterally toward the right. The casing 17 is provided with a suitably sized slot 30 for ejecting the slide to the outside of the casing. When the lowermost slide A is thus ejected, the middle slide B will then drop to the lowermost position, causing the slide C to become positioned in the middle or effective position. Means may be provided in connection with the lever 25 so that, after it is moved to eject a slide, it may be automatically restored to its initial position. Such means may comprise the weight of one or more elements of the linkage system, such as the link 45 hereinafter described, acting on the short arm 25b to urge the lever 25 in a clockwise direction. It is noted, however, that in restoring the member 28 to its original starting position, it is necessary to prevent the finger 28a from engaging the right hand or adjacent vertical edge of the newly positioned lowermost slide. To this end, there is provided the following construction.

Attached to the wall 19 adjacent to the lower edge of the slot 29 is a longitudinal cam plate 31, having a portion 31a (Fig. 4) spaced from the wall to form a channel track 32. Attached to the member 28 is a pin 33 which is designed to freely move in the said track 32, which is arcuately curved to correspond to the slot 29. The track 32 is of uniform width for a distance substantially equal to the horizontal dimension of the slide. Attached to the right hand end of the wall 31a is a cam member 35 having a resilient portion 35a normally biased in a direction toward the wall 19 and disposed in the path of movement of the pin 33 (see Fig. 7). The free end of the said resilient portion 35a may normally lie in a narrow groove 35b on the plate 19.

It is therefore seen that when the pin 33 moves in the track 32 during the action of ejecting the lowermost slide, upon reaching the spring portion 35a it will resiliently move the said spring 35a out of its path. After the pin 33 has passed the end of the spring 35a, the said spring will snap back to its normally biased position with its end below the surface of the plate 19, and upon the restoring action being exerted on the lever 25, the pin 33 will ride from the surface of the plate 19 to the outer surface of the spring 35a and along the outer surface of the wall 31a until it reaches the left hand end of the said wall 31a, at which time the said pin will fall into its normal position within the track 32.

To facilitate the operation of the slide moving mechanism above described from the exterior of the projector, the following construction is employed. Pivotally attached to the wall 18 by means of a pivot 40, fixed to the said wall 18, is an operating lever 41 having a portion 41a thereof freely projecting through a slotted opening 42 in the casing 17, and a portion 41b thereof disposed within the casing 14. The portion 41a of the lever 41 is provided with a suitable finger platform 43 to facilitate operation of the lever. A link 45 pivotally interconnects the arm 25b of the lever 25 with the portion 41b by means of the pivots 46 and 47. It is therefore seen from the above described construction that when a downward pressure is exerted on the platform 43 the lever 41 will rotate about the pivot 40 in a counter-clockwise direction to cause the lever 25 to rotate about its pivot 26 in the same direction to eject the lowermost slide, as hereinbefore described. Upon release of the pressure on the platform 43, the levers 25 and 41 will be restored to normal position by the force of gravity, or the lever 41 may be manually operated to restore the same to normal position.

In accordance with this invention, the following means has been provided whereby the incandescent lamp will be automatically deenergized during the movement of the mechanism for changing the slides, and will again be automatically energized when a new slide is in proper optical position. Attached to the portion 41b of the lever 41 for movement therewith, by any suitable means such as a strap member 44, is a mercury switch member 55. Attached to one end of the switch member 55 are the conductor wires 47 and 48 leading to a source of current supply (see Fig. 6). In the circuit formed by the lead lines 49 and 48 and the mercury switch 55 is the incandescent bulb L serving as the light source for the projector and the control switch S.

It is noted that the normal position of the mercury switch 55 is as shown in Fig. 2, in which the said switch is tilted toward the wires 49 and 48 to electrically interconnect them by the mercury in the switch 55. It is in such position that the bulb L may be energized by closing the control switch and the middle slide B will be projected. In Fig. 5 there is illustrated the step in the operation of the slide moving mechanism in which the finger piece 43 has been pressed to start the rotation of the lever 41. It is noted that the pivot 47 is designed to operate in a slot 45a in the link 45, and that in the normal position of the slide moving mechanism the pin 47 is disposed at the uppermost limit of the slot 45a. The lost motion thus provided permits sufficient counter-clockwise movement of the lever 41 to tilt the mercury switch 55 to break the lamp circuit and extinguish the bulb L before movement of the lowermost slide has begun.

Fig. 6 illustrates the action of the lever system for moving the slides when the rotation of the lever 41 is continued in a counter-clockwise direction to completely eject the lowermost slide in the manner hereinbefore desired. When the lever 41 is again restored to its normal position, as in Fig. 2, the mercury switch 55 will again complete the circuit to energize the bulb L and project the newly positioned slide. An opening 42 may be provided in the casing 17 to permit the free upward movement of the lever 11.

In the embodiment of my invention hereinabove described, the slides are fed vertically and permitted to automatically move into position under the action of gravity. However, the slides, arranged and fed in end-to-end relation, may be moved into projecting position by a spring or other suitable mechanism.

It will thus be seen that there is provided a device in which the several objects of this invention are achieved, and which is well adapted to meet the conditions of practical use.

As various possible embodiments might be made in the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a slide projector of the character described, a pair of spaced parallel plates comprising a vertical passageway adapted to freely receive a plurality of slides in end-to-end relation, a slot in one of said plates transverse to the longitudinal axis of said passageway, a finger projecting through said slot, means to move said finger along said slot to sweep across the path of the slides in said passageway, said finger being pivotally mounted on said means, a cam having two spaced cam surfaces parallel to said slot, a cam follower carried by said finger and adapted to ride on either of said surfaces, and means to cause said follower to shift position so as to be ready to ride on the other cam surface after passing the end of either of said cam surfaces.

2. In a slide projector of the character described, a pair of spaced parallel plates comprising a vertical passageway adapted to freely receive a plurality of slides in end-to-end relation, a slot in one of said plates transverse to the longitudinal axis of said passageway, a finger projecting through said slot, means to move said finger along said slot to sweep across the path of the slides in said passageway, said finger being pivotally mounted on said means, a cam track, a cam surface spaced from said track, said track and said surface being parallel to said slot, a cam follower carried by said finger and adapted to ride in said cam track and on said cam surface, and a resilient member comprising a continuation of said cam surface obliquely closing one end of said track.

3. In a slide projector of the character described, a pair of spaced parallel plates comprising a vertical passageway adapted to freely receive a plurality of slides in end-to-end relation, a slot in one of said plates transverse to the longitudinal axis of said passageway, a finger projecting through said slot, means to move said finger along said slot to sweep across the path of the slides in said passageway, said finger being pivotally mounted on said means, a cam track, a cam surface spaced from said track, said track and said surface being parallel to said slot, a cam follower carried by said finger and adapted to ride in said cam track and on said cam surface, and a resilient member comprising a continuation of said cam surface obliquely closing one end of said track, the free end of said resilient member being disposed in an indentation in one of the walls of said track.

GEORGE KENDE.